United States Patent
Johns (10) Patent No.: US 11,595,349 B2
(45) Date of Patent: *Feb. 28, 2023

(54) CONTENT DELIVERY SYSTEM USING EMBEDDED REQUESTOR INFORMATION

(71) Applicant: Level 3 Communications, LLC, Broomfield, CO (US)

(72) Inventor: Kevin Johns, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,161

(22) Filed: Nov. 23, 2021

(65) Prior Publication Data

US 2022/0086120 A1 Mar. 17, 2022

Related U.S. Application Data

(63) Continuation of application No. 16/867,759, filed on May 6, 2020, now Pat. No. 11,196,704.

(Continued)

(51) Int. Cl.
*H04L 61/4511* (2022.01)
*H04L 61/4552* (2022.01)
(Continued)

(52) U.S. Cl.
CPC ...... *H04L 61/4511* (2022.05); *H04L 61/4552* (2022.05); *H04L 61/5007* (2022.05); *H04L 67/1001* (2022.05); *H04L 67/568* (2022.05)

(58) Field of Classification Search
CPC ............. H04L 61/4511; H04L 61/4552; H04L 61/5007; H04L 67/1001; H04L 67/568; H04L 2101/69; H04L 67/1021
See application file for complete search history.

(56) References Cited

U.S. PATENT DOCUMENTS 7,003,555 B1 * 2/2006 Jungck ................ H04L 67/1017
709/219
9,584,328 B1 * 2/2017 Graham-Cumming ....................
H04L 61/5007

(Continued)

OTHER PUBLICATIONS

International Preliminary Report on Patentability, dated Jul. 5, 2022, Int'l Appl. No. PCT/US20/054269, Int'l Filing Date Oct. 5, 2020, 9 pgs.

(Continued)

*Primary Examiner* — Cheikh T Ndiaye (57) ABSTRACT

A DNS resolution request for a hostname of a CDN is received. An edge server of the CDN may be identified, which may be associated with a subnet. The subnet is used to generate a response IP address, where the remaining bits of the response IP address may be used to store requestor information (e.g., a requestor IP address). When a client computing device uses the response IP address to access the edge server, requestor information is extracted and associated with client computing device information (e.g., an IP address and/or location, etc.) in an association record. Association records may be used to determine predicted characteristics for devices served by a requestor. When the authoritative DNS server resolves a request from the requestor, such predicted characteristics may be used rather than relying solely on information about a requestor. Thus, an edge server proximate to the predicted location may be returned instead.

12 Claims, 6 Drawing Sheets

Related U.S. Application Data (60) Provisional application No. 62/955,596, filed on Dec. 31, 2019.

(51) Int. Cl.
*H04L 61/5007* (2022.01)
*H04L 67/568* (2022.01)
*H04L 67/1001* (2022.01)

(56) References Cited

U.S. PATENT DOCUMENTS

| | | | |
|---|---|---|---|
| 2010/0161799 A1* | 6/2010 | Maloo | H04L 61/4511 709/226 |
| 2011/0283018 A1* | 11/2011 | Levine | H04L 61/4511 709/245 |
| 2015/0372969 A1 | 12/2015 | Hopkins et al. | |
| 2015/0372972 A1 | 12/2015 | Kennedy | |
| 2017/0244667 A1 | 8/2017 | Maslak | |
| 2020/0344205 A1* | 10/2020 | Majkowski | H04L 61/5007 |
| 2021/0203630 A1 | 7/2021 | Johns | |

OTHER PUBLICATIONS

International Search Report and Written Opinion of the International Searching Authority, dated Jan. 18, 2021, Int'l Appl. No. PCT/US20/054269, Int'l Filing Date Oct. 5, 2020, 19 pgs.

Contavalli, C. et al., "Client Subnet in PNS Queries", Internet Engineering Task Force, IETF; Standard, Internet Society (ISOC); rfc7871.txt; XP015112866 [retrieved on May 20, 2016] , pp. 1-30.

\* cited by examiner

FIG. 4

CONTENT DELIVERY SYSTEM USING EMBEDDED REQUESTOR INFORMATION

BACKGROUND

When resolving a hostname of a content distribution network (CDN), certain information may be evaluated to select an edge server of the CDN and provide its associated Internet Protocol (IP) address. The selected IP address is provided to a client device, which it may then use to access content. However, the structure of the domain name system limits the information that is available for the resolution process, which may result in the selection of a suboptimal edge server IP address as compared to other available IP addresses.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe a content delivery system using embedded requestor information. In an example, a request to resolve a hostname is received (e.g., from a requestor, such as an intermediate Domain Name System (DNS) server), where the hostname is associated with a content distribution network (CDN). An edge server of the CDN may be identified, where the edge server is associated with an Internet Protocol (IP) address subnet. Accordingly, the IP address subnet is used to generate a response IP address, where the remaining bits of the response IP address (e.g., those other than the IP address subnet) may be used to store requestor information. For example, an indication as to a requestor IP address is stored therein.

When a client computing device uses the response IP address to access the edge server, the edge server extracts the requestor information and associates information about the client computing device with the requestor information. For example, an IP address and/or a location of the client computing device is associated with the requestor information in an association record. Association records may be aggregated and used to determine predicted characteristics for a population of client computing devices served by a requestor. A mapping may be generated for a given requestor that indicates one or more predicted characteristics of a client computing device population associated with the requestor. Such mappings may be distributed to one or more authoritative DNS servers of the CDN. Accordingly, when an authoritative DNS server resolves a request for a given hostname, a mapping may be used to determine predicted characteristics of a client computing device population rather than solely relying on information about a requestor. Thus, instead of returning an IP address for an edge server that is proximate to the requestor (e.g., based only on information about the requestor), an IP address for an edge server that is proximate to a predicted client computing device location may instead be returned (e.g., based on the predicted characteristics indicated by the mapping).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A content distribution network (CDN) comprises a set of edge servers that are used to process client requests from client computing devices. In examples, edge servers are geographically dispersed. In order to direct client requests from a client computing device to a specific edge server, an authoritative Domain Name System (DNS) server associated with the CDN resolves a hostname of the CDN (e.g., as may be requested by the client computing device) to an Internet Protocol (IP) address associated with the specific edge server. In some examples, the specific edge server is selected based at least in part on a geographic location associated with the requesting client computing device, among other information. The client computing device then communicates with the specific edge server to send requests, receive responses, and/or to access content, among other examples.

However, due to the hierarchical structure of the Domain Name System (DNS), accurate information about the client computing device may not be available when resolving a CDN hostname to an edge server IP address. As an example, if a client computing device resolves the CDN hostname via an intermediate DNS server (e.g., a caching resolver), the authoritative DNS server would receive a DNS resolution request from the intermediate DNS server rather than from the client computing device. As a result, the authoritative DNS server is unable to determine information about the client computing device (e.g., an IP address, a location, a device type, etc.) and may instead only be able to evaluate information about the intermediate DNS server. In such instances, the IP address returned by the authoritative DNS server may be for an edge server that is proximate to the intermediate DNS server, even if a different edge server is available that is more proximate to the client computing device. Thus, due to the limited information about the client computing device that is available to the authoritative DNS server, it is difficult to identify a proximate edge server of the CDN for client computing devices. It will be appreciated that while examples are described herein with respect to selecting an edge server according to the proximity between an edge server and a client computing device, ultimate selection of an edge server may depend on a variety of other additional considerations, including, but not limited to, available computing resources (e.g., bandwidth, storage capacity, etc.), geographical distribution of client computing devices, served by the CDN, and/or network latency information.

Accordingly, aspects of the present disclosure relate to a content delivery system using an embedded requestor address. In examples, an authoritative DNS server of a CDN embeds information about the requestor of a DNS resolution request (e.g., an intermediate DNS server) into an IP address that is provided in response to the DNS resolution request (e.g., as an AAAA DNS record). Thus, the payload of the response provided to the requestor includes an IP address that comprises the requestor information. The response IP address is then ultimately provided to a client computing device. As a result, when the client computing device uses the response IP address to access an edge server of the CDN, the requestor information embedded in the IP address is extracted by the edge server and used to form an association with information relating to the client computing device, which may be stored as an association record. Such association records may be aggregated within the CDN.

Association records may be processed to generate a mapping between requestor information and client computing device information, thereby enabling one or more inferences to be generated for a population of client computing devices associated with a given requestor. For example, the association records may be analyzed to determine that a requestor (e.g., an intermediate DNS server), on average, serves a client computing device population associated with a specific geographic region (e.g., a city, a zip code, a latitude/longitude, etc.), such that an authoritative DNS server of the CDN may be configured to resolve hostnames based on the proximity of CDN edge servers to the specific geographic region. Thus, the authoritative DNS server need not have access to information for an individual client computing device and is instead able to use requestor information to select an edge server according to predicted characteristics of the population of client computing devices served by the requestor (in this example, the intermediate DNS server).

In examples, requestor information embedded in a DNS resolution response IP address comprises an IP address of the requestor. Accordingly, the resolution response message may comprise two occurrences of at least a part of the requestor IP address: once in the destination field of the IP packet and once as part of the response IP address in the payload of the resolution response message. For example, a 128-bit IPv6 response address is generated, where the most significant 64 bits of the response address are a subnet associated with an edge server (e.g., 0123:4567:89ab:cdef:: 0/64, which represents a range of addresses from 0123:4567: 89ab:cdef:0000:0000:0000:0000 to 0123:4567:89ab:cdef: ffff:ffff:ffff:ffff that are assigned to the edge server). Accordingly, the least significant 64 bits may be used to store at least a part of an IP address for the requestor. In examples where the IP address of the requestor is a 32-bit IPv4 address, the entire IPv4 address may be stored in the generated response address (e.g., in the least-significant 32 bits, in the bits immediately after the subnet of the edge server, etc.). Using an example IPv4 address of 17.34.51.68 (i.e., comprised of four octets: 0x11 for 17, 0x22 for 34, 0x33 for 51, and 0x44 for 68), a response IPv6 address generated based on the example subnet above may be 0123:4567:89ab:cdef:0000:0000:1122:3344, where 1122: 3344 in the least-significant 32 bits represents the above example IPv4 address of the requestor.

It will be appreciated that additional information about the requestor may be stored in the remaining 32 bits, including, but not limited to, a timestamp (e.g., at least a subset of bits of a Unix timestamp), a location or region (e.g., as American Standard Code for Information Interchange (ASCII) or Unicode character values, such as "USA," "MIDWEST," "AMERICA/DENVER," etc., or as a unique identifier that is mapped to the location or region), or at least a part of the hostname for which resolution was requested. While the above example is discussed in a context where 64 bits of the IPv6 address is usable to store requestor information, it will be appreciated that any of a variety of other address segmentations may be used (e.g., a 32-bit subnet for an edge server that yields 96 bits for requestor information, a 96-bit subnet for an edge server that yields 32 bits for requestor information, or a 112-bit subnet that yields 16 bits for requestor information, among other examples).

In examples, the IP address of a requestor may not fit in the number of bits that are available for storing requestor information. Such examples may include instances where the IP address of the requestor is longer than the number of available bits (e.g., when the number of available bits is less than a 128-bit IPv6 address or a 32-bit IPv4 address, etc.). In such instances, the IP address of the requestor may be truncated or otherwise processed to retain only a subset of the bits, such that the truncated IP address is used when generating the response IP address. For example, the x most significant or least significant bits (e.g., 16 bits, 32 bits, 64 bits, etc.) of an IP address may be selected and used in the response IP address. As another example, a middle subset of the requestor IP address may be used. In some instances, one or more special characters or patterns may be used to represent a repeating set of bits (e.g., to replace consecutive sections of zeroes, to indicate leading zeros were omitted, etc.).

In some examples, at least a part of the requestor address may be used to generate a hash (e.g., a cyclic redundancy check (CRC) code, an MD5 message-digest hash, a secure hash algorithm 1 (SHA-1) hash, etc.) of an appropriate length or from which a subset of bits may be used, such that the hash may be embedded into the response IP address according to aspects described herein. The hash may be associated with the IP address in a data store (e.g., at a computing device of the CDN), such that the hash may later be used to retrieve the full IP address. Thus, it will be appreciated that any of a variety of techniques may be used to adapt a requestor IP address into a length that fits within the available number of bits of a response IP address. Similar techniques may be used to reduce the number of bits used to store the requestor IP address in order to make bits available for additional requestor information (such as the example requestor information described above). For example, 16 bits may be used to represent a requestor IP address, while another 16 bits may be used to represent a requestor location.

Once a client computing device receives the response IP address (e.g., from an intermediate DNS server) and uses the IP address to access the associated edge server, the edge server extracts the requestor information embedded in the destination IP address of the request (which is the response IP address above). As an example, a subnet of the edge server is removed from the destination IP address, such that the remaining bits of the destination address are the requestor information. In some examples, the remaining bits are at least a part of an IP address associated with the requestor, as described above.

In some instances, the requestor information is in a predetermined format, such that it may be segmented into fields comprising respective information types. For example, if the requestor information comprises an IP address and a timestamp, the x most significant bits may be used as the IP address of the requestor, while the y least significant bits may be used as the timestamp. It will be appreciated that any number of information types (e.g., an IP address, a timestamp, a location, etc.) may be stored using such segmentation. In other examples, padding, one or more bits indicating the length of a segment, or other data separation techniques may be used. In examples, the edge server performs additional processing using the requestor information. For example, a timestamp embedded therein may be a subset of bits of a Unix timestamp, such that the edge server processes the subset of bits to generate a full Unix timestamp. As another example, the requestor information may comprise a unique identifier for a location, which the edge server may resolve using a mapping, table, or other association between the unique identifier and the location. In a further example, a hash of an IP address may be used to identify the full IP address associated with the hash. While the above examples are described as being performed at an edge server of the CDN, it will be appreciated that, in other examples, other computing devices of a CDN may perform some or all of such aspects.

In examples, the requestor information is used to generate an association record. As described above, an association record comprises requestor information and client computing device information. For example, the association record comprises the requestor IP address, timestamp, and/or location, among other requestor information. The association record further comprises information about the client computing device, including, but not limited to, at least a part of an IP address associated with the client computing device (e.g., the source IP address of a request received by the edge server, a subnet associated with the client computing device, etc.), a location of the client computing device, device characteristics (e.g., a device type, operating system version, software version, screen resolution, etc.), and/or client request information (e.g., a requested resource type, video codec, associated bitrate, and/or associated resolution).

Association records are processed to generate mappings between requestor information and client computing device information. For example, a set of association records are processed to associate a set of client computing device IP addresses with a given requestor IP address, such that a population of computing devices served by the requestor is determined. The set of client computing device IP addresses may be evaluated to determine a geographic location for each IP address, thereby generating a distribution of client computing device locations. Accordingly, a mapping may be generated between the requestor (e.g., based on the IP address of the requestor) and a predicted client computing device location (e.g., according to a mode of the locations distribution, an average latitude/longitude based on the locations, etc.). As a result, when the requestor contacts an authoritative DNS server to resolve a hostname of the CDN, the authoritative DNS server may identify an edge server that is proximate to the predicted location rather than a location associated with the requestor.

It will be appreciated that any of a variety of other information may be generated to map predictions to a given requestor. For example, a predicted device type or predicted content request type may be generated according to a similar analysis of client computing device information as described above. As another example, location information within the association records (e.g., as may have been gathered by edge servers of the CDN) may be evaluated as an alternative to or in addition to performing geolocation on client computing device IP addresses. Finally, while an example mapping based on requestor IP addresses is described above, other requestor information may be used as an alternative to or in addition to a requestor IP address in order to associate a given requestor with a client computing device population prediction.

Figure 1:
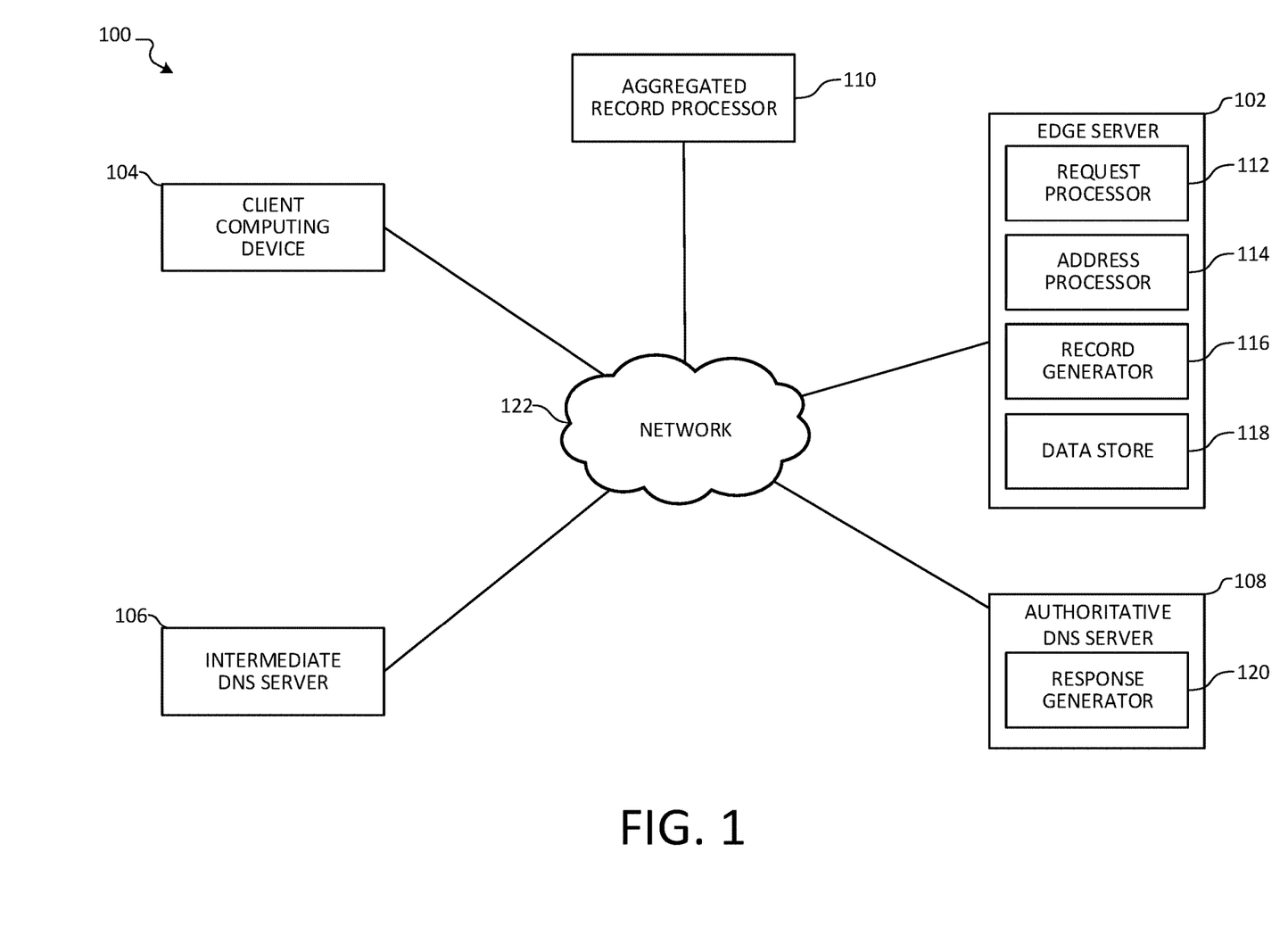
FIG. 1 illustrates an overview of an example system in which aspects of a content delivery system using embedded requestor information may be practiced.

FIG. 1 illustrates an overview of an example system 100 in which aspects of a content delivery system using embedded requestor information may be practiced. As illustrated, system 100 comprises edge server 102, client computing device 104, intermediate DNS server 106, authoritative DNS server 108, aggregated record processor 110, and network 122. Edge server 102, client computing device 104, intermediate DNS server 106, authoritative DNS server 108, and aggregated record processor 110 are illustrated communicating through network 122. Network 122 may comprise a local area network, a wide area network, one or more cellular networks, and/or the Internet, among other examples.

Client computing device 104 may be any of a variety of computing devices, including, but not limited to, a mobile computing device, a tablet computing device, a laptop computing device, or a desktop computing device. In examples, client computing device 104 communicates with edge server 102 of a CDN in order to send requests, receive responses, and/or to access content, among other examples. For example, client computing device 104 resolves a hostname of a CDN using intermediate DNS server 106. Intermediate DNS server 106 communicates with authoritative DNS server 108 in order to determine an IP address for the hostname (e.g., associated with edge server 102), which intermediate DNS server 106 provides to client computing device 104. Client computing device 104 then uses the IP address to communicate with edge server 102 accordingly. It will be appreciated that, while system 100 is described with respect to one edge server 102, one client computing device 104, one intermediate DNS server 106, one authoritative DNS server 108, and one aggregated record processor 110, any number of such elements may be used in other examples.

Authoritative DNS server 108 is illustrated as comprising response generator 120, which generates an IP address in response to a DNS resolution request for a hostname of the CDN. Response generator 120 determines an edge server to process client requests associated with the hostname. In examples, the determination comprises an evaluation of a geographic location associated with the requestor as compared geographic locations of available edge servers. In other examples, a mapping is used to determine a client computing device population associated with a given requestor. Such aspects are described in greater detail below.

A response IP address generated by response generator 120 comprises requestor information according to aspects described herein. For example, a 128-bit IPv6 response address is generated, where the most significant 64 bits of the response address are a subnet associated with a determined edge server (e.g., edge server 102). Accordingly, the remaining 64 bits may be used to store requestor information, including, but not limited to, an IP address associated with the requestor, a timestamp, a location, and/or a hostname, among other information. Thus, returning to the example above, the IP address provided to client computing device 104 via intermediate DNS server 106 comprises a subnet associated with edge server 102 and requestor information associated with intermediate DNS server 106, such that the IP address is usable by edge server 102 to associate client computing device 104 with intermediate DNS server 106, as is described in greater detail below.

Edge server 102 is illustrated as comprising request processor 112, address processor 114, record generator 116, and data store 118. In examples, request processor 112 processes client requests from client computing devices (e.g., client computing device 104). For example, request processor 112 accesses relevant content from data store 118, requests un-cached content from one or more origin servers or other edge servers (not pictured) of the CDN in order to provide such content to the client computing device, and/or handles other processing associated with received requests (e.g., performing computational operations either in addition to or as an alternative to providing content, as may be the case in an online gaming scenario).

Address processor 114 of edge server 102 analyzes destination IP addresses associated with client requests received by edge server 102 (and processed by request processor 112, as discussed above). For example, address processor 114 extracts requestor information from a destination IP address by removing an IP address subnet associated with edge server 102 from the IP address. In some instances, address processor 114 processes the extracted requestor information (e.g., according to predefined field lengths, padding, one or more bits indicating field lengths, etc.) to identify different requestor information types stored therein, as described above.

In other examples, address processor 114 processes a timestamp within the requestor information (e.g., comprising a subset of bits for a Unix timestamp) to generate a full Unix timestamp. As another example, address processor 114 processes a unique identifier for a location of the requestor information based on a mapping (e.g., as may be stored in data store 118, provided by aggregated record processor 110, etc.) to determine the location with which the unique identifier is associated. As a further example, address processor 114 process a hash of an IP address of the requestor information to identify the full IP address with which the hash is associated. It will be appreciated that such processing may be performed by other aspects of system 100, such as by record generator 116 of edge server 102 and/or aggregated record processor 110, among other examples.

Record generator 116 processes requestor information extracted by address processor 114 to generate an association record. In examples, record generator 116 communicates with request processor 112 to collect client computing device information, including, but not limited to, at least a part of a source IP address of a client request (e.g., as may be received by edge server 102), a location of the client computing device, device characteristics, and/or client request information. Record generator 116 generates an association record comprising the requestor information and the client computing device information, which is stored in data store 118.

System 100 is further illustrated as comprising aggregated record processor 110, which aggregates association records from edge servers, such as edge server 102 and other edge servers (not pictured). In examples, aggregation occurs periodically, where aggregated record processor 110 retrieves association records from edge servers according to a predetermined schedule. In some examples, edge servers periodically transmit association records to aggregated record processor 110. As another example, data aggregation occurs in response to an event, such as the identification of a change in request patterns (e.g., increased requests for a certain hostname, a temporal shift in request volume, etc.) and/or a change in availability of content within the CDN (e.g., new content is added, existing content is removed, etc.).

According to aspects described herein, aggregated record processor 110 processes the aggregated association records to generate mappings between a requestor (e.g., intermediate DNS server 106) and client computing device information (e.g., client computing device 104). For example, aggregated record processor 110 associates a set of client computing device IP addresses with a given requestor IP address in order to determine a population of client computing devices served by the requestor is determined. Aggregated record processor 110 may determine a geographic location for each client computing device IP address, thereby generating a distribution of client computing device locations.

Accordingly, aggregated record processor 110 generates a mapping between the requestor (e.g., based on the IP address of the requestor) and a predicted client computing device location (e.g., based on information about the client computing device reported by the edge server). Aggregated record processor 110 may provide such mappings to one or more authoritative DNS servers within the CDN (e.g., authoritative DNS server 108). As a result, when intermediate DNS server 106 requests resolution of a CDN hostname on behalf of client computing device 104, authoritative DNS server 108 uses the mapping to determine a predicted location of a client computing device population (e.g., comprising client computing device 104) associated with intermediate DNS server 106. Accordingly, authoritative DNS server 108 identifies edge server 102, which is determined to be proximate to the client computing device population of intermediate DNS server 106, rather than the location of intermediate DNS server 106 itself.

It will be appreciated that, in other examples, aspects described herein with respect to aggregated record processor 110 may be performed by an edge server. For example, an edge server within a geographic region may perform such aspects to aggregate data from other edge servers in the geographic region. As another example, an origin server of the CDN may perform the data aggregation aspects disclosed herein. In some examples, data aggregation may be hierarchical (e.g., performed by edge servers in each respective region, after which the data is aggregated from such edge servers at an origin server).

Figure 2:
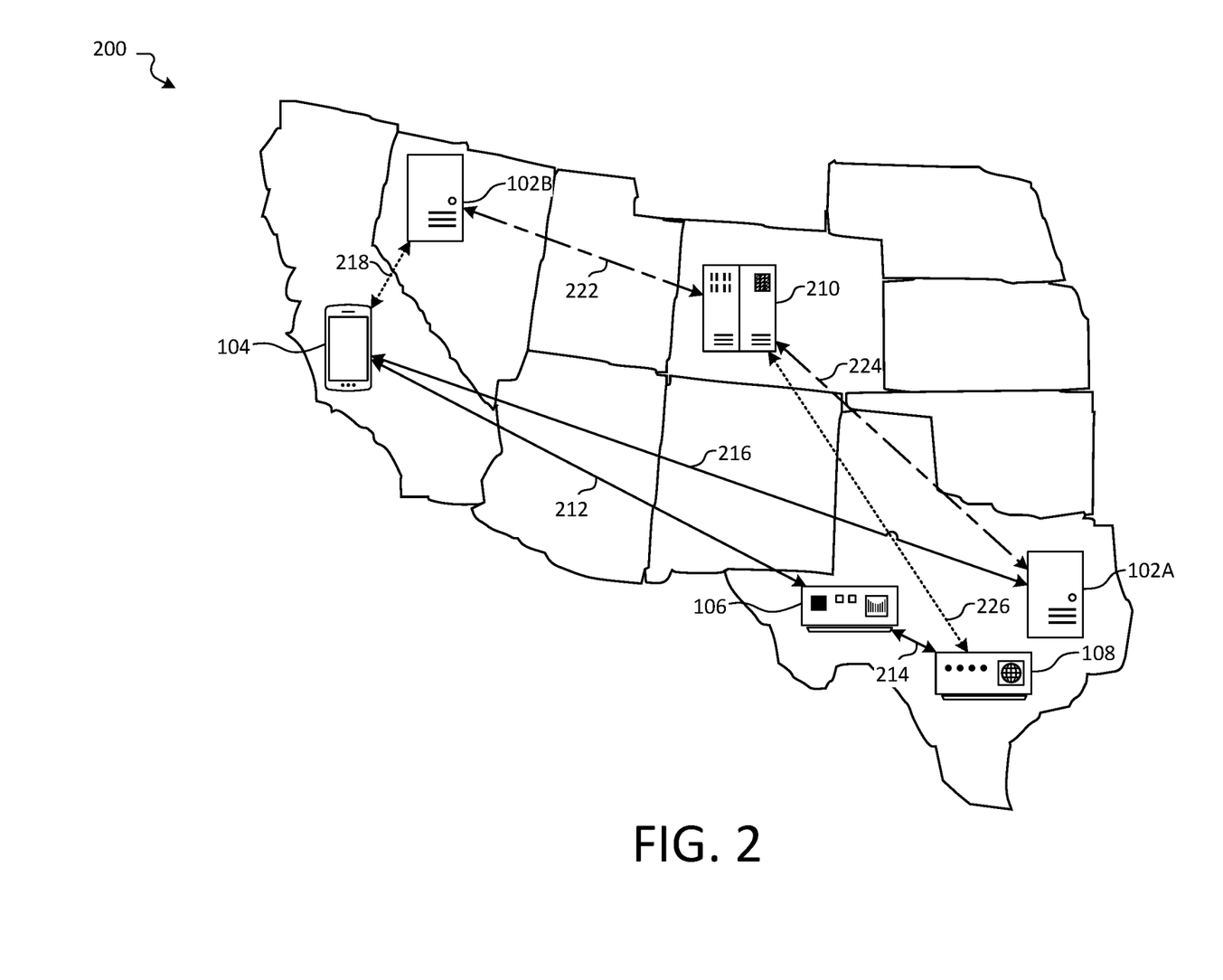
FIG. 2 illustrates an overview of another example system in which aspects of a content delivery system using embedded requestor information may be practiced.

FIG. 2 illustrates an overview of another example system 200 in which aspects of a content delivery system using embedded requestor information may be practiced. System 200 depicts an example communication flow between client computing device 104 and components of a CDN (e.g., authoritative DNS server 108, edge servers 102A and 102B, and origin server 210) to highlight example technical and geographic difficulties that are addressed by aspects of the present disclosure. For example, system 200 shows client computing device 104 in California, while intermediate DNS server 106 is in Texas. Thus, system 200 illustrates an example in which an internet service provider uses an intermediate DNS server that is not proximate to client computing devices for which it processes DNS resolution requests. Certain aspects of system 200 are discussed above with respect to system 100 in FIG. 1 and are therefore not re-described in detail below.

Arrow 212 illustrates a DNS resolution request from client computing device 104 to intermediate DNS server 106. In examples, the DNS resolution request is generated by client computing device 104 when client computing device 104 attempts to access content for which the CDN is responsible using a hostname of the CDN. Accordingly, intermediate DNS server 106 determines that authoritative DNS server 108 is responsible for resolving the hostname to an IP address (e.g., via a CNAME record pointing to authoritative DNS server 108) and subsequently issues a request (arrow 214) to authoritative DNS server 108 to resolve the hostname.

Thus, even though client computing device 104 is the initial device requesting resolution of the hostname, authoritative DNS server 108 receives a resolution request from intermediate DNS server 106 with no indication that the resolution request is on behalf of client computing device 104. Authoritative DNS server 108 selects one of edge servers 102A or 102B and provides an IP address associated with the selected edge server in response (arrow 214). In examples where the mapping techniques described herein are not used, authoritative DNS server 108 may determine a location for intermediate DNS server 106 and determine that edge server 102A is most proximate to the intermediate DNS server 106. Accordingly, authoritative DNS server 108 provides an IP address associated with edge server 102A in response.

Client computing device 104 ultimately receives the IP address for edge server 102A and requests content from edge server 102A, as illustrated by arrow 216. Thus, even though edge server 102B is more proximate to client computing device 104, authoritative DNS server 108 was unaware that the DNS resolution request was ultimately initiated by client computing device 104 and was therefore unable to provide the IP address of a better-suited edge server in response.

In other examples and according to aspects described herein, the IP address generated by authoritative DNS server 108 (e.g., by response generator 120 in FIG. 1) comprises requestor information. As a result, edge server 102A receives the requestor information in the destination IP address of a client request for content from client computing device 104 using the generated IP address. Edge server 102A extracts the requestor information (e.g., as may be performed by address processor 114 in FIG. 1) and also collects client computing device information. Accordingly, edge server 102A generates an association record that associates information about the intermediate DNS server 106 with information about the client computing device 104.

Origin server 210 may distribute content to edge servers 102A and 102B, which content may subsequently be provided by the edge servers to client computing devices in accordance with various CDN techniques. In examples, origin server 210 aggregates association records from edge servers 102A and 102B (illustrated by arrows 222 and 224).

Such aspects may be similar to those discussed above with respect to aggregated record processor 110. Accordingly, origin server 210 processes the aggregated association records to generate mappings based on information from edge server 102A and/or 102B. For example, a mapping may be generated for intermediate DNS server 106, indicating that a certain percentage of the population of client computing devices served by intermediate DNS server 106 (e.g., client computing device 104) is located in California, even though intermediate DNS server 106 is located in Texas.

Origin server 210 provides the generated mappings to authoritative DNS server 108, as illustrated by arrow 226. It will be appreciated that while the example CDN of system 200 is illustrated as having only one intermediate DNS server 106 and only one authoritative DNS server 108, any number of such servers may be used. In instances where multiple authoritative DNS servers are present, a subset of mappings may be provided to an authoritative DNS server (e.g., based on a set of requestors served by a respective authoritative DNS server, based on the regions served by the authoritative DNS server, etc.).

Returning to the example of a DNS resolution request from client computing device 104, but now in the context of the requestor information and mapping aspects described herein, authoritative DNS server 108 uses a mapping received from origin server 210 to determine characteristics of a client computing device population associated with intermediate DNS server 106. Thus, rather than returning an IP address for edge server 102A based on its proximity to intermediate DNS server 106, the mapping enables authoritative DNS server 108 to predict a location of the population of client computing devices (e.g., California) for which intermediate DNS server 106 resolves requests. As one example, the mapping may indicate that a majority of client computing devices served by intermediate DNS server 106 are located in California and nearby states, despite intermediate DNS server 106 being located in Texas. Accordingly, it may be more likely, upon receiving a DNS resolution request from intermediate DNS server 106, that content from the CDN would be better served from edge server 102B, rather than edge server 102A. As a result, authoritative DNS server 108 provides an IP address associated with edge server 102B, such that client computing device 104 ultimately accesses content from edge server 102B (as illustrated by dashed arrow 218).

Figure 3A:
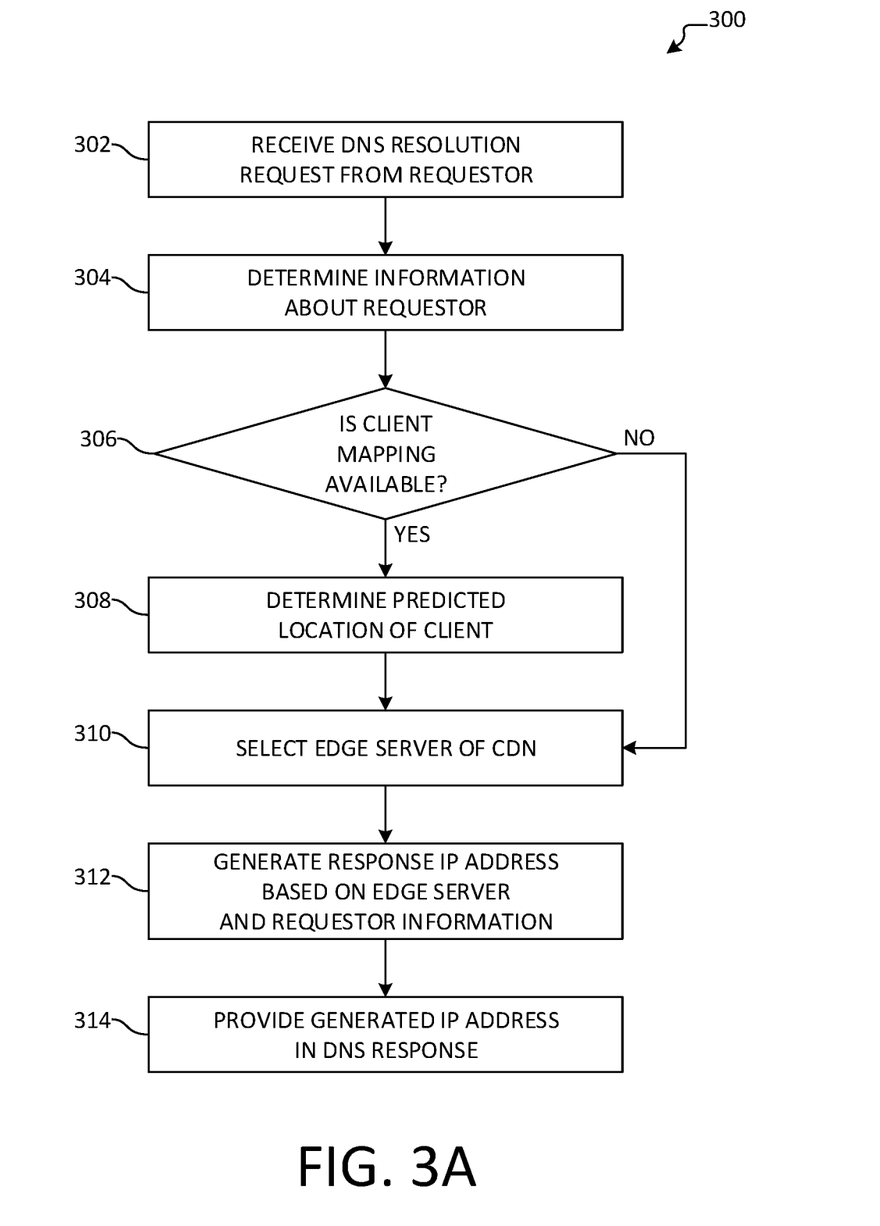
FIG. 3A illustrates an overview of an example method for generating a DNS response to a DNS resolution request according to aspects described herein.

FIG. 3A illustrates an overview of an example method 300 for generating a DNS response to a DNS resolution request according to aspects described herein. In examples, aspects of method 300 are performed by an authoritative DNS server, such as authoritative DNS server 108 in FIGS. 1-2. Method 300 begins at operation 302, where a DNS resolution request is received from a requestor. In examples, the requestor is an intermediate DNS server, such as intermediate DNS server 106 in FIGS. 1-2. The DNS resolution request may comprise a source IP address (e.g., of the requestor), a destination IP address (e.g., of the recipient authoritative DNS server), and a hostname for which DNS resolution is requested.

Flow progresses to operation 304, information is determined about the requestor. In examples, the determined requestor information comprises an IP address of the requestor (e.g., from a source address of the resolution request received at operation 302), a geographic location (as may be determined based on the IP address of the requestor, based on traceroute information, etc.), and/or a timestamp associated with when the request was received.

At determination 306, it is determined whether a client mapping is available. A set of mappings may be available (e.g., as may have been generated according to aspects described above with respect to aggregated record processor 110 in FIG. 1 or origin server 210 in FIG. 2) and may be evaluated to determine whether any mappings for the requestor are present. The information about the requestor determined at operation 304 may be used to determine whether a mapping is available. For example, an IP address of the requestor in the resolution request message may be used to identify a mapping. As another example, a mapping may be identified according to a subnet mask (e.g., 12.0.0.0/8, 12.0.0.0/16, etc.), as may be the case if a block of IP addresses are associated with a common internet service provider, company, or other entity.

If it is determined that a mapping is available, flow branches "YES" to operation 308, where a predicted client location is determined based on the mapping. As described above, the mapping may indicate one or more predicted client computing device characteristics, including, but not limited to, a predicted location, a predicted device type, and/or a predicted content request type. Thus, a predicted location of a client may be determined based on the mapping. In other examples, one or more other predicted client computing device characteristics may be determined in addition to or as an alternative to the predicted client location. Flow then progresses to operation 310, which is discussed below.

If, however, it is determined that a mapping is not available at determination 306, flow instead branches "NO" to operation 310, where an edge server is selected. In examples where a mapping is unavailable (e.g., when determination 306 branches "NO") or not determinative, selecting the edge server comprises determining a geographic location associated with the source IP address of the request received at operation 302. A mapping may be deemed not determinative if multiple locations are identified by the mapping with no one location having a likelihood above a predetermined threshold (e.g., a mapping indicates two locations, each with a similar likelihood, etc.). Other techniques may be used to determine whether one or more predicted characteristics of a mapping are determinative, such as identifying a trend away from the predicted characteristic based on a series of observations or determining that the mapping is older than a predetermined number of days (and is therefore "stale"). The geographic location may be used to evaluate a set of edge servers of the CDN to identify an edge server that is proximate to the determined geographic location of the requestor (e.g., intermediate DNS server).

By contrast, if a mapping is available (e.g., when determination 306 branches "YES"), predicted characteristics associated with the mapping (e.g., determined at operation 308) are used as an alternative to or in addition to the information about the requestor discussed above with respect to operation 304. For example, rather than using a location associated with the requestor, a predicted location determined at operation 308 may be used to select an edge server of the CDN accordingly. It will be appreciated that other information may be evaluated in addition to or as an alternative to geographic proximity, including, but not limited to, available processing capacity, estimated or actual latency, and/or whether content associated with the hostname is available.

Moving to operation 312, a response IP address is generated based on both the selected edge server and the requestor information. As discussed herein, the response IP address is generated based on an IP address subnet associated with the edge server selected at operation 310. For example, the response IP address is a 128-bit IPv6 address, where the selected edge server is assigned a 64-bit subnet. In such examples, the most significant 64 bits of the generated IP address are the subnet assigned to the selected edge server. It will be appreciated that any address and/or subnet length may be used according to aspects described herein.

The remaining bits of the IP address (e.g., the least significant 64 bits in the above example) are used to store the requestor information (as was determined at operation 304). For example, the requestor information comprises a 32-bit IP address associated with the requestor. In other examples, the IP address of the requestor may not fit, such as in instances where the number of available bits is less than the length of a 128-bit IPv6 address or a 32-bit IPv4 address. In such instances, the IP address of the requestor may be truncated or otherwise processed to retain only a subset of the bits, such that the truncated IP address is used when generating the response IP address.

As another example, at least a part of the requestor address may be used to generate a hash of an appropriate length or from which a subset of bits may be used. In such instances, the hash may be associated with the requestor IP address in a data store (e.g., data store 118 or aggregated record processor 110 in FIG. 1 or origin server 210 in FIG. 2), such that the hash may later be used to retrieve the full IP address. Thus, it will be appreciated that any of a variety of techniques may be used to adapt a requestor IP address into a length that fits within the available number of bits of a response IP address. Additionally, such techniques may be used to reduce the number of bits used to store the requestor IP address in order to make bits available for additional requestor information. As discussed above, such additional requestor information includes, but is not limited to, a timestamp, a location or region, or at least a part of the hostname for which resolution was requested.

In some instances, the requestor information is stored in the generated response IP address according to a predetermined format, such that it may be segmented into fields comprising respective information types. For example, if the requestor information comprises an IP address and a timestamp, the x most significant bits may be used as the IP address of the requestor, while the y least significant bits may be used as the timestamp. In other examples, padding, one or more bits indicating the length of a segment, or other data separation techniques may be used.

At operation 314, the generated IP address is provided as a DNS resolution response to the resolution request that was received at operation 302. For example, the payload of the DNS resolution response comprises the generated IP address, while the destination field of the DNS resolution response comprises the IP address of the requestor. Thus, the DNS response may comprise two instances of the requestor IP address: once in the destination field of the IP packet and once as part of the generated IP address (as described above) in the payload of the response. While method 300 is discussed as comprising operations 304-312 in which an edge server is selected, requestor information is determined, and a response IP address is generated, it will be appreciated that, in other examples, the generated IP address is cached and retrieved from a cache based on an association with a requestor. As a result, operations 304-312 need not be performed to process every request from a given requestor. Flow terminates at operation 314.

Figure 3B:
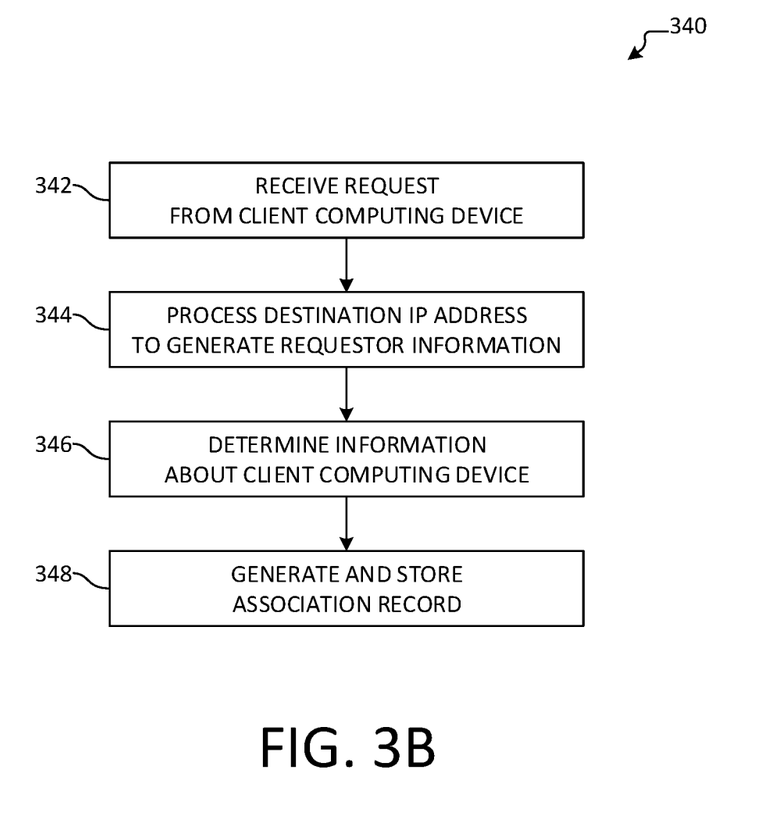
FIG. 3B illustrates an overview of an example method for processing a client request from a client computing device at an edge server according to aspects described herein.

FIG. 3B illustrates an overview of an example method 340 for processing a client request from a client computing device at an edge server according to aspects described herein. In examples, aspects of method 340 are performed by an edge server, such as edge servers 102, 102A, or 102B in FIGS. 1-2. Method 340 begins at operation 342, where a client request is received from a client computing device. Aspects of operation 342 may be performed by a request processor, such as request processor 112 of edge server 102 in FIG. 1. In examples, the client request is for a resource associated with a hostname and comprises a source IP address (e.g., of the client computing device, such as client computing device 104 in FIGS. 1-2) and a destination IP address (e.g., associated with the edge server). The client request may be received by the edge server based on a resolution of the hostname to the IP address of the edge server, as may be performed at least in part by an authoritative DNS server (e.g., authoritative DNS server 108 in FIGS. 1-2) performing aspects of method 300 in FIG. 3A.

At operation 344, the destination IP address is processed to generate requestor information. Aspects of operation 344 may be performed by an address processor, such as address processor 114 of edge server 102 in FIG. 1. For example, requestor information is extracted from the IP address of the edge server (e.g., the destination IP address of the request received at operation 342) by removing an IP address subnet associated with the edge server from the IP address. In some instances, different types of requestor information is identified according to predefined field lengths, padding, and/or one or more bits indicating field lengths, among other examples.

In other examples, operation 344 further comprises performing additional processing of the extracted requestor information, such as generating a full Unix timestamp, determining a location based on a unique identifier, and/or processing a hash of an IP address to identify the full IP address with which the hash is associated. While example requestor information types and associated processing techniques are discussed, it will be appreciated that any of a variety of other information types and processing may be used according to aspects described herein.

Moving to operation 346, client computing device information is determined. Example client computing device information includes, but is not limited to, at least a part of an IP address associated with the client computing device (e.g., the source IP address of the client request received at operation 342), a location of the client computing device (e.g., as may be determined based on the IP address, based on an indication from the client computing device in the client request, etc.), device characteristics (e.g., a device type, operating system version, software version, screen resolution, etc.), and/or client request information (e.g., a requested resource type, video codec, associated bitrate, and/or associated resolution). In examples, at least some of the client computing device information is determined by communicating with a request processor, such as request processor 112 of edge server 102 in FIG. 1.

At operation 348, an association record is generated. The association record may be generated by a record generator, such as record generator 116 of edge server 102 in FIG. 1. According to aspects described herein, the association record comprises the requestor information generated at operation 344 and the client computing device information determined at operation 346. In examples, the association record is stored in a data store, such as data store 118 of edge server 102 in FIG. 1. Method 340 terminates at operation 348.

Figure 3C:
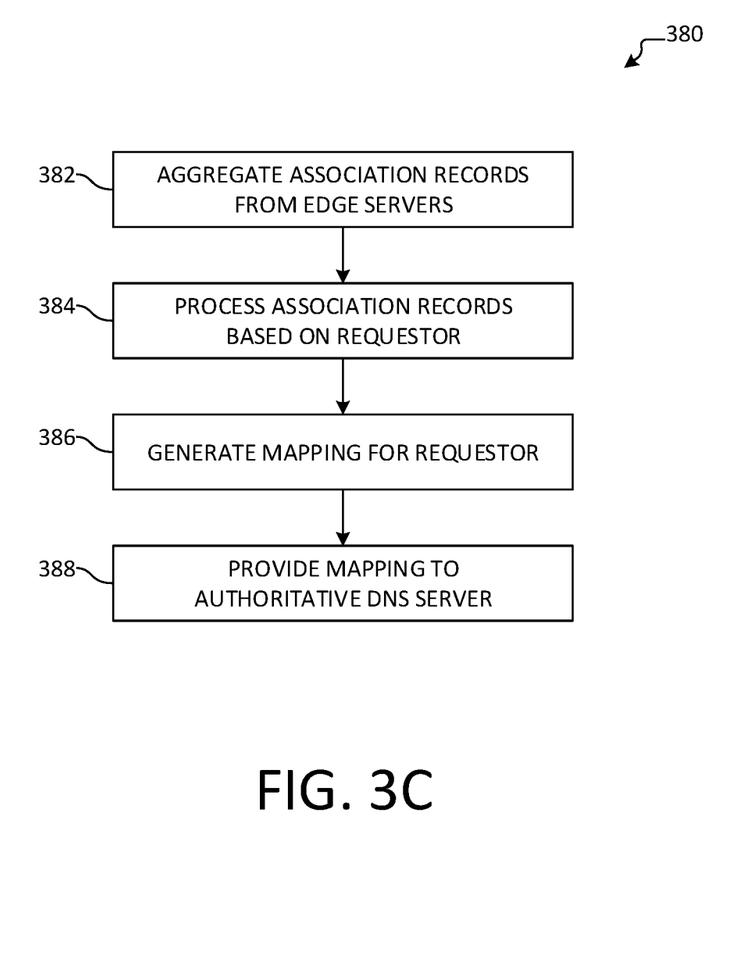
FIG. 3C illustrates an overview of an example method for processing a set of association records to generate a mapping between a resolver and one or more predicted characteristics of a client computing device population.

FIG. 3C illustrates an overview of an example method 380 for processing a set of association records to generate a mapping between a resolver and one or more predicted characteristics of a client computing device population. As described above, such aspects may be performed by an aggregated record processor (e.g., aggregated record processor 110 in FIG. 1) and/or an origin server (e.g., origin server 210 in FIG. 2), among another computing devices.

Method 380 begins at operation 382, where association records are aggregated from edge servers of a CDN (e.g., edge servers 102, 102A, and 102B in FIGS. 1-2). In examples, records are periodically aggregated from the edge servers (e.g., according to a predetermined schedule, after a predetermined amount of time has elapsed, etc.) or may be aggregated from edge servers in response to an event, such as the identification of a change in request patterns (e.g., increased requests for a certain hostname, a temporal shift in request volume, etc.) and/or a change in availability of content within the CDN (e.g., new content is added, existing content is removed, etc.). Association records may be retrieved from edge servers or may be received from edge servers, or any combination thereof.

At operation 384, the association records are processed and sorted based on a requestor associated with each respective association record. For example, a set of association records is generated for a given requestor (e.g., according to requestor IP address, a subnet, etc.), such that the set of association records represents a population of computing devices served by the requestor. It will be appreciated that other requestor information types may be used in addition to or as an alternative to a requestor IP address to sort association records according to aspects described herein.

Flow progresses to operation 386, where one or more mappings are generated for a requestor. As an example, a set of aggregation records is processed to determine a geographic location for each client computing device therein (e.g., based on evaluating an IP address to determine a geographic location, based on a location stored within the association record, etc.). The resulting distribution of client computing device locations may be used to determine a predicted location representative of the population of client computing devices served by the requestor. For example, a most common (e.g., mode) location may be used, or the latitude/longitude of each location may be evaluated to generate an average location having the shortest possible distance from the locations in the distribution. Thus, the mapping generated at operation 386 associates the requestor with the predicted location according to aspects described herein.

It will be appreciated that additional or alternative characteristics may be determined for a population of client computing devices according to aspects described herein. Other example characteristics include, but are not limited to, device characteristics (e.g., a device type, operating system version, software version, screen resolution, etc.) and/or client request information (e.g., a requested resource type, video codec, associated bitrate, and/or associated resolution). Thus, while examples are provided where a mapping is generated and an edge server is determined accordingly based at least in part on a predicted location, other examples may comprise an evaluation of a predicted device type, predicted requested resource type, and/or a predicted video codec, among other examples.

Flow progresses to operation 388, where the one or more mappings generated at operation 386 are provided to an authoritative DNS server. In examples, operation 388 comprises determining a subset of the mappings generated at operation 386, where the subset of mappings is determined based on a set of requestors that has been historically observed by the authoritative DNS server or based on one or more regions that are served by the authoritative DNS server, among other examples. In some instances, the mappings are communicated to the authoritative DNS server while, in other examples, the mappings are stored (e.g., at an origin server, such as origin server 210 in FIG. 2) for retrieval by the authoritative DNS server. Method 380 terminates at operation 388.

Figure 4:
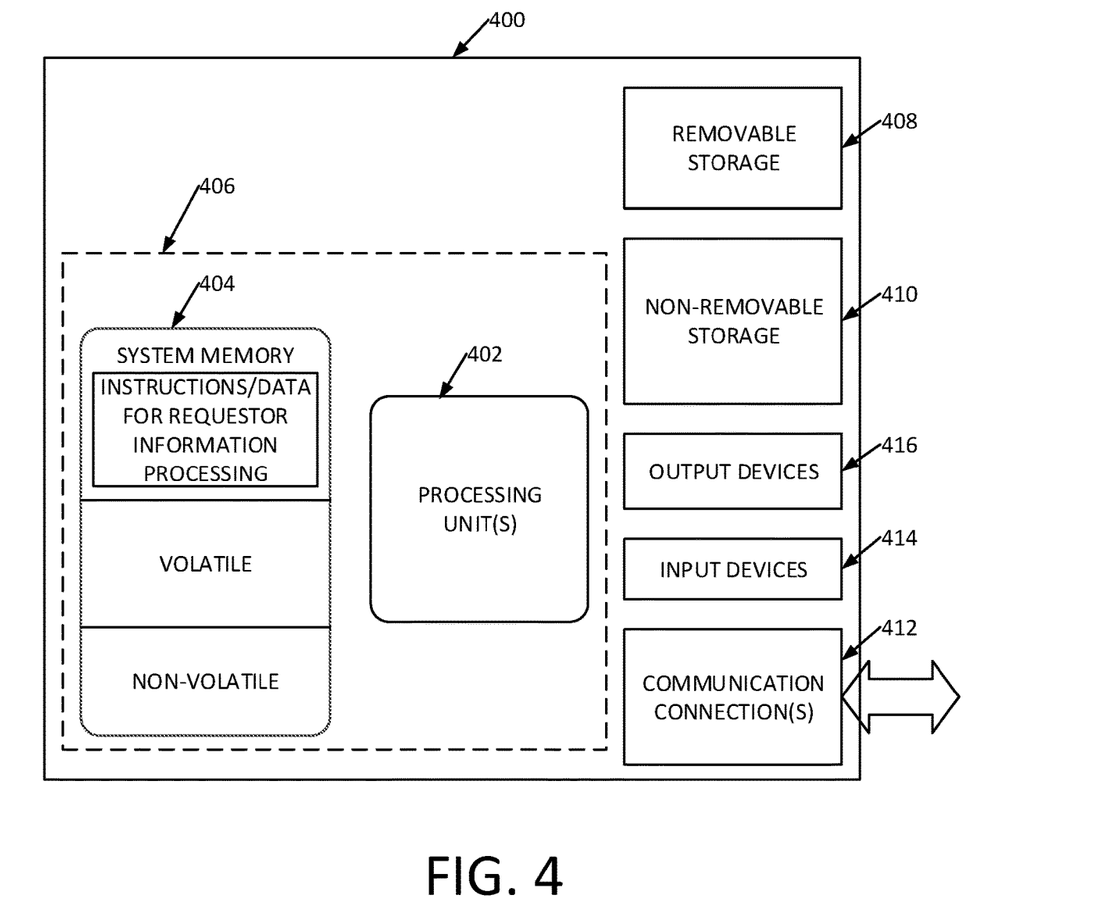
FIG. 4 illustrates an example of a suitable operating environment in which one or more of the present embodiments may be implemented.

FIG. 4 illustrates an example of a suitable operating environment 400 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 400 typically may include at least one processing unit 402 and memory 404. Depending on the exact configuration and type of computing device, memory 404 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as a keyboard, mouse, pen, voice input, etc. and/or output device(s) 416 such as a display, speakers, printer, etc. Also included in the environment may be one or more communication connections, 412, such as LAN, WAN, point to point, etc.

Operating environment 400 may include at least some form of computer readable media. The computer readable media may be any available media that can be accessed by processing unit 402 or other devices comprising the operating environment. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 404. While executing on the processing unit 402, program modules (e.g., applications, Input/Output (I/O) management, and other utilities) may perform processes including, but not limited to, one or more of the stages of the operational methods described herein such as the methods illustrated in FIGS. 3A-3C, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 400 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

This disclosure described some aspects of the present technology with reference to the accompanying drawings, in which only some of the possible embodiments were shown. Other aspects may, however, be embodied in many different forms and should not be construed as limited to the embodiments set forth herein. Rather, these aspects were provided so that this disclosure was thorough and complete and fully conveyed the scope of the possible embodiments to those skilled in the art.

Although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:
   at least one processor; and
   memory, operatively connected to the at least one processor and storing instructions that, when executed by the at least one processor, cause the system to perform a set of operations, the set of operations comprising:
   receiving a request to resolve a hostname of a content distribution network (CDN), the request comprising a source Internet Protocol (IP) address of a requestor;
   determining an edge server of the CDN, wherein the edge server is associated with an IP address subnet;
   generating, based on the IP address subnet of the edge server, a response IP address comprising requestor information, the requestor information comprising an indication of the source IP address of the requestor, wherein the response IP address includes the IP address subnet of the edge server; and
   providing a response to the request to resolve the hostname, wherein a payload of the response comprises the generated response IP address.

2. The system of claim 1, wherein:
   the generated response IP address is an IPv6 address;
   the source IP address of the requestor is an IPv4 address; and
   the indication of the source IP address is a full representation of the IPv4 address.

3. The system of claim 1, wherein:
   the generated response IP address is an IPv6 address;
   the source IP address of the requestor is an IPv6 address; and
   the indication of the source IP address is a subset of bits of the IPv6 address of the source IP address.

4. The system of claim 1, wherein the IP address subnet of the edge server is in a most significant set of bits of the generated response IP address and the requestor information is in a least significant set of bits of the generated response IP address.

5. The system of claim 1, wherein the requestor is an intermediate Domain Name System (DNS) server.

6. The system of claim 1, wherein determining the edge server of the CDN comprises evaluating a location associated with the requestor.

7. A method for embedding requestor information in a Domain Name System (DNS) resolution request, the method comprising:
   receiving a request to resolve a hostname of a content distribution network (CDN), the request comprising a source Internet Protocol (IP) address of a requestor;
   determining an edge server of the CDN, wherein the edge server is associated with an IP address subnet;
   generating, based on the IP address subnet of the edge server, a response IP address comprising requestor information, the requestor information comprising an indication of the source IP address of the requestor, wherein the response IP address includes the IP address subnet of the edge server; and
   providing a response to the request to resolve the hostname, wherein a payload of the response comprises the generated response IP address.

8. The method of claim 7, wherein:
   the generated response IP address is an IPv6 address;
   the source IP address of the requestor is an IPv4 address; and
   the indication of the source IP address is a full representation of the IPv4 address.

9. The method of claim 7, wherein:
   the generated response IP address is an IPv6 address;
   the source IP address of the requestor is an IPv6 address; and
   the indication of the source IP address is a subset of bits of the IPv6 address of the source IP address.

10. The method of claim 7, wherein the IP address subnet of the edge server is in a most significant set of bits of the generated response IP address and the requestor information is in a least significant set of bits of the generated response IP address.

11. The method of claim 7, wherein the requestor is an intermediate Domain Name System (DNS) server.

12. The method of claim 7, wherein determining the edge server of the CDN comprises evaluating a location associated with the requestor.

* * * * *